(12) United States Patent
Baranowski et al.

(10) Patent No.: US 7,521,838 B2
(45) Date of Patent: Apr. 21, 2009

(54) DEVICE FOR OPERATING A PIEZO ACTUATOR

(75) Inventors: Dirk Baranowski, Holzheim a. Forst (DE); Christian Borgmann, Lappersdorf (DE); Klaus Hengl-Betz, Regensburg-Schwabelweis (DE); Thorsten Lauer, Holzheim a. Forst (DE)

(73) Assignee: VDO Automotive AG, Regensburg (DE)

( * ) Notice: Subject to any disclaimer, the term of this patent is extended or adjusted under 35 U.S.C. 154(b) by 0 days.

(21) Appl. No.: 12/037,632

(22) Filed: Feb. 26, 2008

(65) Prior Publication Data

US 2008/0211346 A1 Sep. 4, 2008

(30) Foreign Application Priority Data

Mar. 2, 2007 (DE) ........................ 10 2007 010 263

(51) Int. Cl.
*H02N 2/06* (2006.01)
*F02D 41/20* (2006.01)
*F02M 51/06* (2006.01)

(52) U.S. Cl. .................... 310/317; 310/316.03; 123/498

(58) Field of Classification Search ............ 310/316.01, 310/316.03, 317; 123/299, 478, 486, 498
See application file for complete search history.

(56) References Cited

U.S. PATENT DOCUMENTS

| | | | |
|---|---|---|---|
| 6,606,974 B1* | 8/2003 | Duffy et al. ................. | 123/299 |
| 7,051,699 B2* | 5/2006 | McGee et al. ............... | 123/295 |
| 7,055,494 B2* | 6/2006 | Nishimaki ................... | 123/299 |
| 7,111,614 B1* | 9/2006 | Coldren et al. .............. | 123/467 |
| 7,121,250 B2* | 10/2006 | Yokoyama .............. | 123/196 R |
| 7,268,473 B2* | 9/2007 | Berlemont ................... | 310/366 |
| 7,337,767 B2* | 3/2008 | Magarida et al. ............. | 123/486 |
| 2006/0174853 A1* | 8/2006 | Koopmans ................... | 123/295 |
| 2006/0272611 A1* | 12/2006 | Souchon et al. ............. | 123/299 |
| 2006/0283425 A1* | 12/2006 | Tsutsui et al. ............... | 123/478 |
| 2007/0055437 A1* | 3/2007 | Yamaguchi et al. ......... | 701/104 |
| 2007/0273246 A1* | 11/2007 | Hopley et al. ............... | 310/317 |

FOREIGN PATENT DOCUMENTS

| | | |
|---|---|---|
| DE | 102004030249 | 6/2004 |
| WO | 03/091559 | 11/2003 |

\* cited by examiner

*Primary Examiner*—Jaydi SanMartin
(74) *Attorney, Agent, or Firm*—Baker Botts L.L.P.

(57) ABSTRACT

A first energy control unit has a pilot controller with an applied setpoint energy and outputs a pilot control signal, and a regulator outputting a regulator signal as a function of the setpoint energy and an actual energy of the piezo actuator. The energy control unit creates a control signal representative for a current threshold of a charge current, depending on the pilot control and regulator signals. Furthermore, there is a second energy control unit for another setpoint energy and another control signal. A power output stage sets a charge current for the piezo actuator as a function of the predetermined control signal and performs this for the predetermined time. A scheduling unit predetermines, for setting the setpoint energy, the control signal and the time to the power output stage, and for setting the another setpoint energy, the another control signal and the time to the another power output stage.

12 Claims, 2 Drawing Sheets

DEVICE FOR OPERATING A PIEZO ACTUATOR

CROSS-REFERENCE TO RELATED APPLICATIONS

This application claims priority to German Patent Application Number 10 2007 010 263.3 filed on Mar. 2, 2007, and which is incorporated herein by reference in its entirety.

TECHNICAL FIELD

The invention relates to a device for operating a piezo actuator.

BACKGROUND

Piezo actuators are being ever more widely used. They are used for example in fluid metering devices which can be embodied for example as an injection valve for dispensing fuel for internal combustion engines.

Ever more stringent legal requirements in relation to permissible pollutant emissions of internal combustion engines which are disposed in motor vehicles make it necessary to take various measures through which the pollutant emissions are reduced. One approach in this case is to reduce the pollutant emissions created during the process of air/fuel mixture combustion. The formation of soot in particular is heavily dependent on the preparation of the air/fuel mixture in the respective cylinder of the internal combustion engine.

In order to obtain a very good mixture preparation, fuel is increasingly dispensed at very high pressure. In the case of diesel engines fuel pressures amount to up to 2000 bar, in the case of petrol engines they amount to around 200 bar. These types of application increasingly involve injection valves with a piezo actuator used as their actuator. The outstanding feature of piezo actuators is their very short response times. These types of injection valve are thus suitable if necessary for dispensing fuel several times within an operating cycle of a cylinder of the internal combustion engine.

An especially good mixture preparation can be achieved if one or more pre-injections, also known as pilot injections, are performed before a main injection, with the mass of fuel to be dispensed for each pilot injection possibly being very small. A precise activation of the injection valves is very important, especially in these cases.

SUMMARY

A simple and reliable device for operating a piezo actuator can be achieved according to an embodiment by a device for operating a piezo actuator, comprising —a first energy control unit with a first pilot controller, which has a first transmission behavior and is operable to have a first setpoint energy value applied to it on the input side and to output a first pilot control signal on the output side, and a first regulator, which is embodied to output a first regulator signal as a function of the first setpoint energy value and a first actual energy value of the piezo actuator, wherein the first energy control unit is further operable to create a first control signal which is representative for a first current threshold value of a charge current for the piezo actuator, depending on the first pilot control signal and the first regulator signal, —a second energy control unit with a second pilot controller, which has a second transmission behavior and which is operable to have a second setpoint energy value applied to it on the input side and to output a second pilot control signal on the output side, and a second regulator, which is operable to output a second regulator signal as a function of the second setpoint energy value and a second actual energy value of the piezo actuator, wherein the second energy control unit is further operable to create a second control signal which is representative for a second current threshold value of a charge current for the piezo actuator, depending on the second pilot control signal and the second regulator signal, —a power output stage unit, which is operable to set a charge current for the piezo actuator depending on the respective predetermined control signal for a respective predetermined time, —a scheduling unit, which is operable: —to predetermine the first and second setpoint energy value, to determine the first and second actual energy values, —to activate the first and second energy control units for creating the first and second control signals, —to predetermine a charge pattern relating to the first to second setpoint energy values, —to predetermine the first control signal and the first time to the power output stage unit for setting the first setpoint energy value, —to predetermine the second control signal and the second time to the power output stage unit for setting the second setpoint energy value and—to apply the signals to the power output stage unit for implementing the charge pattern.

According to a further embodiment, the first and/or second regulator may be embodied as a proportional-integral regulator. According to a further embodiment, the device amay further comprise: —at least one time control unit with a time regulator, which is operable, depending on a third setpoint energy value and a third actual energy value of the piezo actuator, to output a time regulator signal, wherein the time control unit further is operable to determine an adapted third time as a function of a predetermined third period and the time regulator signal, and—the scheduling unit, which is operable—to predetermine the charge pattern in relation to the first to third setpoint energy values, —to predetermine the third control signal and the adapted third time to the power output stage unit for setting the third setpoint energy value. According to a further embodiment, the time regulator is embodied as a proportional-integral regulator. According to a further embodiment, the device may further comprise—at least one further time control unit with a further time regulator, which is embodied to output a further time regulator signal as a function of a fourth setpoint energy value and a fourth actual energy value of the piezo actuator, with the further time control unit being further embodied to determine an adapted fourth time as a function of a predetermined fourth time and to determine the further time regulator signal, and—the scheduling unit, which is operable—to predetermine the charge pattern in relation to the first to fourth setpoint energy values, —to predetermine the first control signal and the adapted fourth time of the power output stage unit for setting the fourth setpoint energy value. According to a further embodiment, the further time regulator may be embodied as a proportional-integral regulator.

BRIEF DESCRIPTION OF THE DRAWINGS

Exemplary embodiments of the invention are explained in greater detail below with reference to the schematic drawings. The figures show.

DETAILED DESCRIPTION

Figure 1:
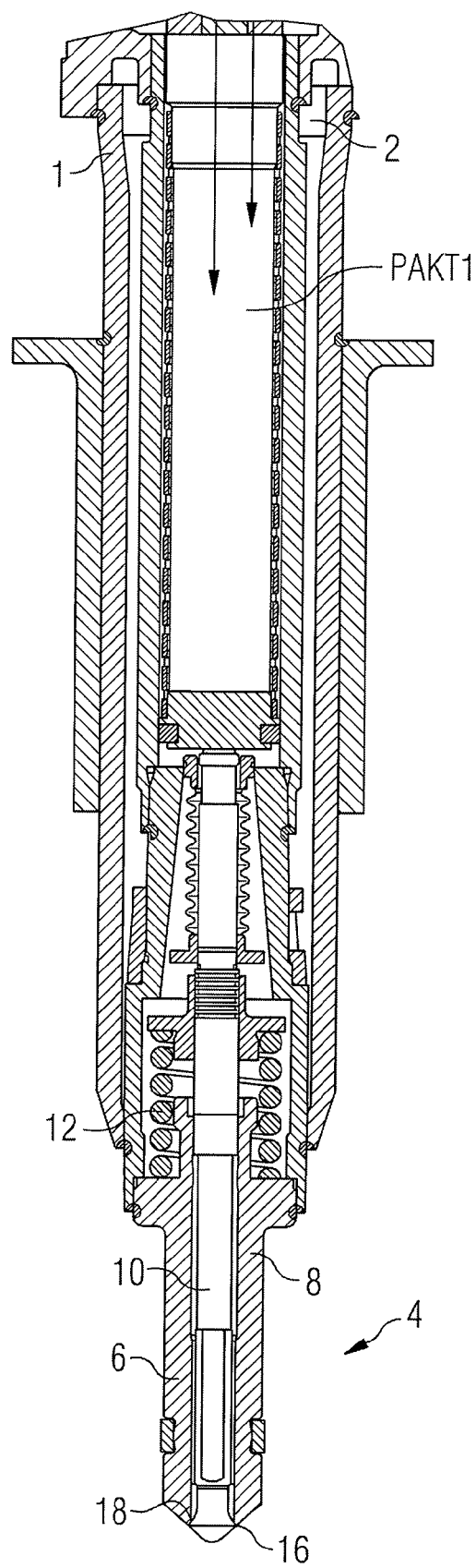
FIG. 1 a fluid metering device with a piezo actuator.

According to an embodiment, a device for operating a piezo actuator may comprise a first energy control unit with a first pilot control unit, which has a first transmission behavior and is embodied to have a first energy setpoint value applied to it on the input side and to output a first pilot signal on the output side. The first energy control unit further comprises a first regulator which is embodied to output a first regulator signal as a function of the first setpoint energy value and a first actual energy value of the piezo actuator. The energy control unit is further embodied to create a first control signal which is representative of a first current threshold value of a charge current for the piezo actuator. It is embodied to create the first control signal depending on the first pilot control signal and the first regulator signal.

A second energy control unit is provided with a second pilot control unit which has a second transmission behavior and which is embodied on the input side to have a second setpoint energy value applied to it and on the output side to output a second pilot control signal. The second energy control unit further has a second regulator which is embodied, depending on the second setpoint energy value and a second actual energy value of the piezo actuator, to output a second regulator signal. The second energy control unit is further embodied to create a second control signal which is representative for a second current threshold of a charge current for the piezo actuator. It is embodied to create the second control signal as a function of the second pilot control signal and the second regulator signal.

An output stage unit is embodied to set a charge current for the piezo actuator as a function of the control signal predetermined for it and to do this for a respective time predetermined for it.

A scheduling unit is embodied to predetermine the first and second setpoint energy value, to determine the first and second actual energy value, to create the first and second energy control units to activate the first and second control signals. It is further embodied to predetermine a charge pattern relating to the first to second setpoint energy values, to predetermine the first control signal and the first time of the output stage unit for setting the first setpoint energy value, to predetermine the second control signal and the second time of the output stage unit for setting the second setpoint energy value and applying them to the output stage unit for implementing the charge pattern.

In this way the first setpoint energy value and independently of this the second setpoint energy value can be set very precisely and thus two different strokes of the piezo actuator can be set precisely. Fluid can further be dispensed in this manner with different stokes of the piezo actuator and thus to an injector needle for example within just one operating cycle in a respective combustion chamber of a cylinder of the internal combustion engine.

The provision of the first and second energy control units enables the first and second setpoint energy values to actually be set very rapidly one after the another and in addition the provision of the first and second regulators allows them to be set very precisely for changing operating conditions.

The device thus makes it possible, even with a piezo actuator acting directly on an actuator, such as for example on the injector needle, to set two different stokes of the actuator simply and precisely.

In accordance with an advantageous embodiment the first and/or second regulator is embodied as a proportional-integral regulator. In this way the inaccuracies occurring in practice in the respective pilot unit can be compensated for especially precisely.

In accordance with a further advantageous embodiment the device comprises at least one time control unit with a time regulator which is embodied, depending on a third setpoint energy value and a third actual energy value of the piezo actuator, to output a time regulator signal. The time control unit is further embodied to determine an adapted third period of time depending on a predetermined third period of time and the time regulator signal. The scheduling unit is embodied in this connection to predetermine the charge pattern in respect of the first to third setpoint energy values and, for the setting of the third setpoint energy value, to predetermine the second control signal and the adapted third time of the output stage unit. In this way the third setpoint energy value can actually be set very precisely, without a further energy control unit being necessary and especially without the output stage unit needing a further physical input for predetermining a further control signal.

The provision of the time regulator thus allows specific influencing variables to be assigned solely to the third setpoint energy value to be compensated for and thereby at least three different setpoint energy values to be set very precisely.

In accordance with a further advantageous embodiment the time regulator is embodied as a proportional-integral regulator. In this way the inaccuracies occurring in practice in the respective pilot unit in respect of the third setpoint energy value can be compensated for especially precisely In accordance with a further advantageous embodiment the device includes at least one further time control unit with a further time regulator, which is embodied, depending on a fourth setpoint energy value and a fourth actual energy value of the piezo actuator, to output a further time regulator signal. The further time control unit is further embodied to determine an adapted fourth period of time depending on a predetermined fourth period of time and the further time regulator signal. The scheduling unit is embodied in this connection to predetermine the charge pattern in relation to the first to fourth setpoint energy values and to predetermine the first control signal and the adapted fourth period of time to the output stage unit for the setting of the fourth setpoint energy value.

In this way at least one fourth setpoint energy value can be set precisely and simply, corresponding to the precise setting of the at least one third setpoint energy value. This allows a plurality of different elongations of the piezo actuator and of strokes of the actuators corresponding to this advantageously assigned to the piezo actuator to be set. The hardware outlay in the output stage unit can however still be limited and this can be done especially in respect of the components necessary for setting the charge current for the piezo actuator and further a temporally very narrowly spaced application to the piezo actuator of a plurality of setpoint energy values is easily possible. Thus, if a number of time control units or a number of further time control units are present, a charge pattern which can comprise more than four setpoint energy values can also be applied to the piezo actuator.

It is also correspondingly advantageous in connection with the provision of the further time control unit for the further time regulator to be embodied as a proportional-integral regulator.

A fluid metering device (FIG. 1) comprises a housing 1 into which a fluid feed 2 is incorporated. When the fluid metering device is operating according to specification, this device is hydraulically coupled to a fluid supply device, which especially supplies the fluid under very high pressure. The fluid metering device can for example be embodied as an injection valve for dispensing fuel in an internal combustion engine.

Figure 2:
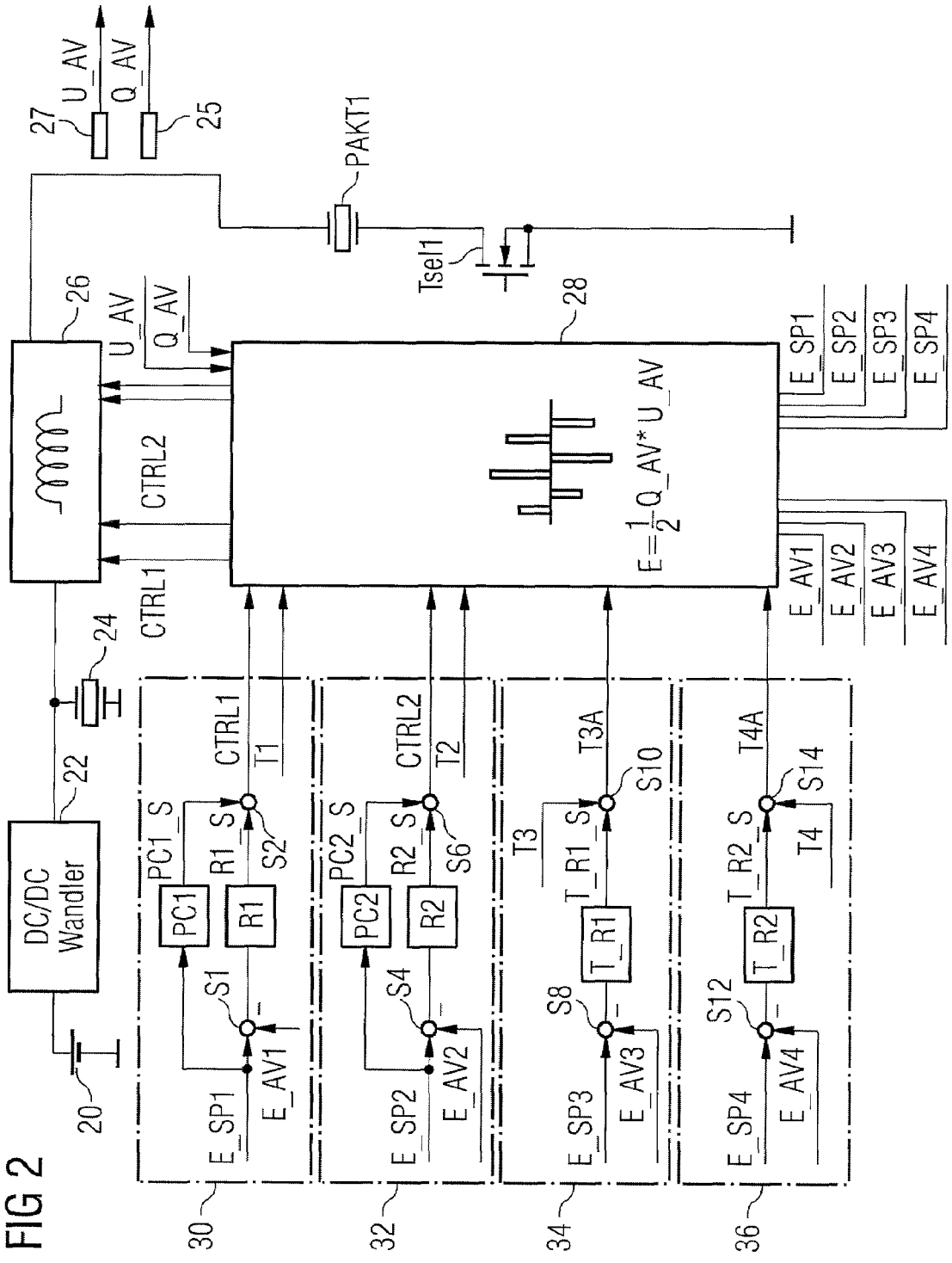
FIG. 2 a device for operating a piezo actuator.

The fluid metering device further comprises a valve body 4, to which a sleeve element 6 is assigned. A valve element recess 8 is provided, into which an injector needle 10 is incorporated. A return spring 12 is provided which is arranged such that, without the action of any other forces, it presses the injector needle 10 into a seat 18 of a nozzle 16 and thus applies force to the injector needle such that it is in its closed position. In its closed position the injector needle suppresses any dispensing of fluid through the nozzle 16. Outside the closed position it releases the nozzle 16 and thus enables fluid to be dispensed through the nozzle 16. The injector needle 10 forms an actuator which is assigned to a piezo actuator PAKT1. The piezo actuator PAKT1 comprises a stack of piezo elements. The piezo actuator PAKT1 is able to be coupled electrically to a power output stage unit 26 (see FIG. 2).

The piezo actuator PAKT1, independently of the electrical energy supplied to it, exerts a different force on the injector needle 10 and in this way explicitly defines its position.

The power output stage unit 26 is embodied to apply to the piezo actuator PAKT1 a charge current for supplying or for removing electrical energy. The power output stage unit 26 can also be assigned to a number and thereby to further piezo actuators, which are assigned to different cylinders of the internal combustion engine for example. The respective piezo actuator to be charged or discharged may be preferably selected via selection element Tsell.

A voltage amplifier 22, which can also be referred to as a DC/DC converter, is electrically coupled to a vehicle electrical system, which is embodied to supply the DC/DC converter 22 with a predetermined voltage and which thus forms a power source. The vehicle electrical system includes a vehicle battery 20 for example.

The DC/DC converter 22 is coupled electrically to the power output stage 26. Preferably a capacitor 24 may be connected between the two and is connected so that electrical energy can be buffered in the capacitor 24 during a discharging process of the respective piezo actuator PAKT1 and can be used for future charging processes. The power output stage 26 especially includes an inductance, which forms an oscillating circuit during coupling with the respective piezo actuator PAKT1 and on the other hand also forms a feeding oscillating circuit via the capacitor 24.

The power output stage 26 includes switching means by means of which a charge current is limited for the respective piezo actuator PAKT1 to a current threshold value predetermined for the power output stage 26. To this end the charge current can thus be set during a charging or discharging process as regards its amount in the sense of a two-level control and thus be set on reaching the current value threshold for the first time within a predetermined hysteresis range, until the charging process or discharging process is to be concluded again. In this connection for example a timing element can be predetermined in the power output stage for example, by means of which, after the timer which is predetermined to the power output stage 26 on the input side times out, the charge current is directed back to a zero value.

Furthermore a charge sensor 25 is provided, which detects an actual charge value Q_AV of an electrical charge supplied during a charging process to the respective piezo actuator PAKT1. For this purpose the charge sensor 25 may be preferably embodied as a current sensor with a hardware integrator.

Furthermore a voltage sensor 27 is provided which detects the voltage present at the respective piezo actuator PAKT1 and especially does so at the conclusion of the charging process and thus detects an actual voltage value U_AV.

A scheduling unit 28 is provided which is embodied to predetermine setpoint energy values. This can for example consist of the setpoint energy values likewise being specified to it by a further unit. The setpoint energy values are determined as a function of operating variables and this is done for example during use in an internal combustion engine and indeed in the sense of a respective stroke of the piezo actuator and of a stoke of the respective actuator correlating with it, especially of the injector needle 10. Different influencing variables, i.e. especially operating variables, such as especially for example the temperature, influence the elongation behavior of the respective piezo actuator PAKT1 and lead to changed setpoint energy values, in order for example to guarantee an identical stroke of the respective actuator. Thus the respective setpoint energy values exhibit at least partly an interdependent change. The respective setpoint energy values are assigned to respective periods which can especially by rigidly predetermined or can also be adaptable.

Operating variables, as well as process variables detected by means of sensors, also include variables derived from these.

In this way the scheduling unit 28 makes the respective setpoint energy values available on the output side and for example makes available first to fourth setpoint energy values E_SP1-E_SP4. In addition the respective actual charge value Q_AV and the respective actual voltage value U_AV which are detected by the charge sensor 25 or the voltage sensor 27 respectively are applied on the input side to the scheduling unit 28. The scheduling unit 28 is embodied to determine a respective electrical energy by means of the respective actual charge value Q_AV and of the respective actual voltage value U_AV depending on the formula specified in FIG. 2.

Thus the scheduling unit 28 is embodied for example to determine first to fourth actual energy values E_AV1-E_AV4. Thus all setpoint energy values, i.e. for example the first to fourth setpoint energy values E_SP are predetermined to the scheduling unit, preferably within a predetermined calculation framework, which can be an operating cycle of an internal combustion engine for example, or are predetermined by them and determined in relation to all setpoint energy values actually set during this respective calculation cycle as a function of a predetermined charge pattern, the corresponding actual energy values E_AV1-E_AV4, The charge pattern can for example be determined by the scheduling unit 28, but can however also be predetermined for example by a further unit of the scheduling unit 28. It can for example be a predetermined injection pattern for implementing a number of separate fluid dispensing operations during a respective calculation cycle with different setpoint energy values where necessary and implement different strokes assigned to these, especially of the nozzle needle 10.

The scheduling unit 28 is further embodied, to have a first and second control signal CTRL1, CTRL2 applied to it on the input side and to forward this signal to the power output stage unit. The first control signal is representative for a first current threshold value of the charge current for the piezo actuator PAKT1. The second control signal is representative for a second current threshold value of the charge current for the piezo actuator PAKT1. The first current threshold value and the second current threshold value are each fixed at a predetermined level only for the power output stage unit 26 within a respective computation cycle, that is for example one operating cycle or also only one respective cylinder segment, but can however be changed subsequently by corresponding other values of the respective first or second control signal CTRL1, CTRL2. Especially preferably the first and second current threshold values basically may differ in respect of their amount and especially by a significant amount.

The scheduling unit 28 is further coupled via an activation input to the power output stage unit 26, via which it can simply activate the first current threshold value or the second current threshold value and can do this to execute a respective charging process, without it being necessary to create the first or second control signal CTRL1, CTRL2 again in order to do this. In addition the first scheduling unit 28 is also still coupled to the power output stage unit 26 for transmission of the respective time for the timer of the power output stage unit 26.

A first energy control unit 30 comprises a first pilot controller PC1 which has a first transmission behavior. The first pilot controller PC1 is embodied to have the first setpoint energy value E_SP1 applied to it on the input side and to output a first pilot control signal PC1_S on the output side. For this purpose the first pilot controller PC1 can for example include an engine map and/or a characteristic curve.

The first energy-control unit 30 further includes a first regulator R1 which is embodied, depending on the first setpoint energy value E_SP1 and the first actual energy value E_AV1 of the piezo actuator. PAKT1 to output a first regulator signal R1_S. To this end a difference between the first setpoint energy value E_SP1 and the first actual energy value E_AV1 may be preferably formed at a summation point S1 and then fed to the first regulator R1. The first regulator R1 may be preferably embodied as a proportional-integral regulator. The first regulator can however basically have any other regulation behavior. In addition an adaptation of the first pilot controller PC1 can also be undertaken depending on the first regulator signal R1_S. The first control signal CTRL1 is created as a function of the first pilot control signal PC1_S and the first regulator signal R1_S and preferably through summation of the two. Furthermore, for the actual setting of the first setpoint energy value E_SP1 a first time T1 is assigned.

A second energy control unit 32 is provided which basically has a corresponding structure to the first energy control unit 30. It comprises a second pilot controller PC2, to which the second setpoint energy value E_SP2 is applied and which outputs a second pilot control signal PC2_S on the output side. The second pilot controller PC2 has a second transmission behavior which differs from the first transmission behavior. In addition the second energy control unit 32 has a second regulator R2 which is embodied to output a second regulator signal R2_S depending on the second setpoint energy value E_SP2 and the second actual energy value E_AV2. The second energy control unit includes summation points S4 and S6. The second control signal CTRL2 is created as a function of the second pilot control signal PC2_S and the second regulator signal R2_S. A second time T2 is assigned for setting the second setpoint energy value E_SP2.

A time control unit 34 comprises a time regulator T_R1, which can for example have a proportional, proportional-integral or integral behavior and which is embodied to output a time regulator signal T_R1_S depending of the third setpoint energy value E_SP3 and the third actual energy value E_AV3 on the output side. Through summation of a predetermined third time T3 and of the time regulator signal T_R1_S an adapted third period T3A is determined, and this is then used for actual setting of the third setpoint energy value E_SP3.

A further time control unit 36 corresponds structurally to the time control unit 34. It has a further time regulator T_R2, which determines as a function of the fourth setpoint energy value E_SP4 and the fourth actual energy value E_AV4 a further time regulator signal T_R2_S. The further time control unit 34 includes summation points S12 and S14 and is embodied to determine a fourth adapted time T4A as a function of a fourth time T4, which is predetermined, and the further time regulator signal T_R2_S.

For setting the first setpoint energy value E_SP1 the scheduling unit 28 activates the power output stage 26 in relation to the first current threshold value and does so for time T1. To set the second setpoint energy value E_SP2, i.e. to supply or also to withdraw the corresponding electrical energy from the piezo actuator PAKT1, the scheduling unit 28 activates the power output stage 26 in relation to the second current threshold value for the time T2. To set the third setpoint energy value E_SP3 the scheduling unit 28 activates the power output stage unit 26 in relation to the second control signal CTRL2 and does so for the adapted third time T3A. To set the fourth setpoint energy value E_SP4 the scheduling unit 28 activates the power output stage unit 26 in relation to the first current threshold value for the adapted fourth time T4A.

As well as the time control unit 34 and also the further time control unit 36, further time control units can then be provided as appropriate. This enables a plurality of different setpoint energy values to be set within one computation cycle using only the two different current threshold values.

Influences in respect of for example the second and third setpoint energy value E_SP2, E_SP3, which contribute to changes in said values, can exhibit essentially the same dependencies by suitable pairing of the respective setpoint energy values, so that dependencies independent of each other which are not taken into consideration in the respective pilot controller, i.e. here especially in the second pilot controller, can be taken into consideration by the first time regulator signal T_R1_S.

What is claimed is:
1. A device for operating a piezo actuator, comprising:
a first energy control unit with a first pilot controller, which has a first transmission behavior and is operable to have a first setpoint energy value applied to it on the input side and to output a first pilot control signal on the output side, and a first regulator, which is embodied to output a first regulator signal as a function of the first setpoint energy value and a first actual energy value of the piezo actuator, wherein the first energy control unit is further operable to create a first control signal which represents a first current threshold value of a charge current for the piezo actuator, depending on the first pilot control signal and the first regulator signal,
a second energy control unit with a second pilot controller, which has a second transmission behavior and which is operable to have a second setpoint energy value applied to it on the input side and to output a second pilot control signal on the output side, and a second regulator, which is operable to output a second regulator signal as a func- tion of the second setpoint energy value and a second actual energy value of the piezo actuator, wherein the second energy control unit is further operable to create a second control signal which represents a second current threshold value of a charge current for the piezo actuator, depending on the second pilot control signal and the second regulator signal, a power output stage unit, which is operable to set a charge current for the piezo actuator depending on the respective predetermined control signal for a respective predetermined time, a scheduling unit, which is operable:
   to predetermine the first and second setpoint energy value, to determine the first and second actual energy values,
   to activate the first and second energy control units for creating the first and second control signals,
   to predetermine a charge pattern relating to the first to second setpoint energy values,
   to predetermine the first control signal and the first time to the power output stage unit for setting the first setpoint energy value,
   to predetermine the second control signal and the second time to the power output stage unit for setting the second setpoint energy value and
   to apply the signals to the power output stage unit for implementing the charge pattern.

2. The device according to claim 1, wherein at least one of the first and second regulator is embodied as a proportional-integral regulator.

3. The device according to claim 1, comprising:
at least one time control unit with a time regulator, which is operable, depending on a third setpoint energy value and a third actual energy value of the piezo actuator, to output a time regulator signal, wherein the time control unit is further operable to determine an adapted third time as a function of a predetermined third period and the time regulator signal, and wherein
the scheduling unit is operable
   to predetermine the charge pattern in relation to the first to third setpoint energy values, and
   to predetermine the third control signal and the adapted third time to the power output stage unit for setting the third setpoint energy value.

4. The device according to claim 3, wherein the time regulator is embodied as a proportional-integral regulator.

5. The device according to claim 1, comprising
at least one further time control unit with a further time regulator, which is embodied to output a further time regulator signal as a function of a fourth setpoint energy value and a fourth actual energy value of the piezo actuator, with the further time control unit being further embodied to determine an adapted fourth time as a function of a predetermined fourth time and to determine the further time regulator signal, and wherein
the scheduling unit is operable
   to predetermine the charge pattern in relation to the first to fourth setpoint energy values, and
   to predetermine the first control signal and the adapted fourth time of the power output stage unit for setting the fourth setpoint energy value.

6. The device according to claim 5, wherein the further time regulator is embodied as a proportional-integral regulator.

7. A method for operating a piezo actuator, comprising the steps of:
applying a first setpoint energy value to a first energy control unit with a first pilot controller;
outputting a first pilot control signal,
outputting a first regulator signal by a first regulator as a function of the first setpoint energy value and a first actual energy value of the piezo actuator,
the first energy control unit creating a first control signal which represents a first current threshold value of a charge current for the piezo actuator, depending on the first pilot control signal and the first regulator signal,
applying a second setpoint energy value to a second energy control unit with a second pilot controller;
outputting a second pilot control signal,
outputting a second regulator signal by a second regulator as a function of the second setpoint energy value and a second actual energy value of the piezo actuator,
the second energy control unit creating a second control signal which represents a second current threshold value of a charge current for the piezo actuator, depending on the second pilot control signal and the second regulator signal,
setting a charge current by a power output stage unit for the piezo actuator depending on the respective predetermined control signal for a respective predetermined time,
predetermining by a scheduling unit the first and second setpoint energy value,
determining by the scheduling unit the first and second actual energy values,
activating by the scheduling unit the first and second energy control units for creating the first and second control signals,
predetermining by the scheduling unit a charge pattern relating to the first to second setpoint energy values,
predetermining by the scheduling unit the first control signal and the first time to the power output stage unit for setting the first setpoint energy value,
predetermining by the scheduling unit the second control signal and the second time to the power output stage unit for setting the second setpoint energy value, and
applying by the scheduling unit the signals to the power output stage unit for implementing the charge pattern.

8. The method according to claim 7, wherein at least one of the first and second regulator is embodied as a proportional-integral regulator.

9. The method according to claim 7, comprising the steps:
depending on a third setpoint energy value and a third actual energy value of the piezo actuator, outputting by at least one time control unit with a time regulator a time regulator signal,
determining an adapted third time as a function of a predetermined third period and the time regulator signal, and
predetermining by the scheduling unit the charge pattern in relation to the first to third setpoint energy values, and
predetermining by the scheduling unit the third control signal and the adapted third time to the power output stage unit for setting the third setpoint energy value.

10. The method according to claim 9, wherein the time regulator is embodied as a proportional-integral regulator.

11. The method according to claim 7, comprising the steps of:
outputting by at least one further time control unit with a further time regulator a further time regulator signal as a function of a fourth setpoint energy value and a fourth actual energy value of the piezo actuator,
determining an adapted fourth time as a function of a predetermined fourth time,
determining the further time regulator signal, predetermining by the scheduling unit the charge pattern in relation to the first to fourth setpoint energy values, and predetermining by the scheduling unit the first control signal and the adapted fourth time of the power output stage unit for setting the fourth setpoint energy value.

12. The method according to claim 11, wherein the further time regulator is embodied as a proportional-integral regulator.

* * * * *